March 11, 1947.  R. S. SEGSWORTH  2,417,218
ROTARY VARIABLE SPEED HYDRAULIC TRANSMISSION
Filed Sept. 16, 1942  2 Sheets-Sheet 1

Inventor:
R. S. Segsworth
by
atty.

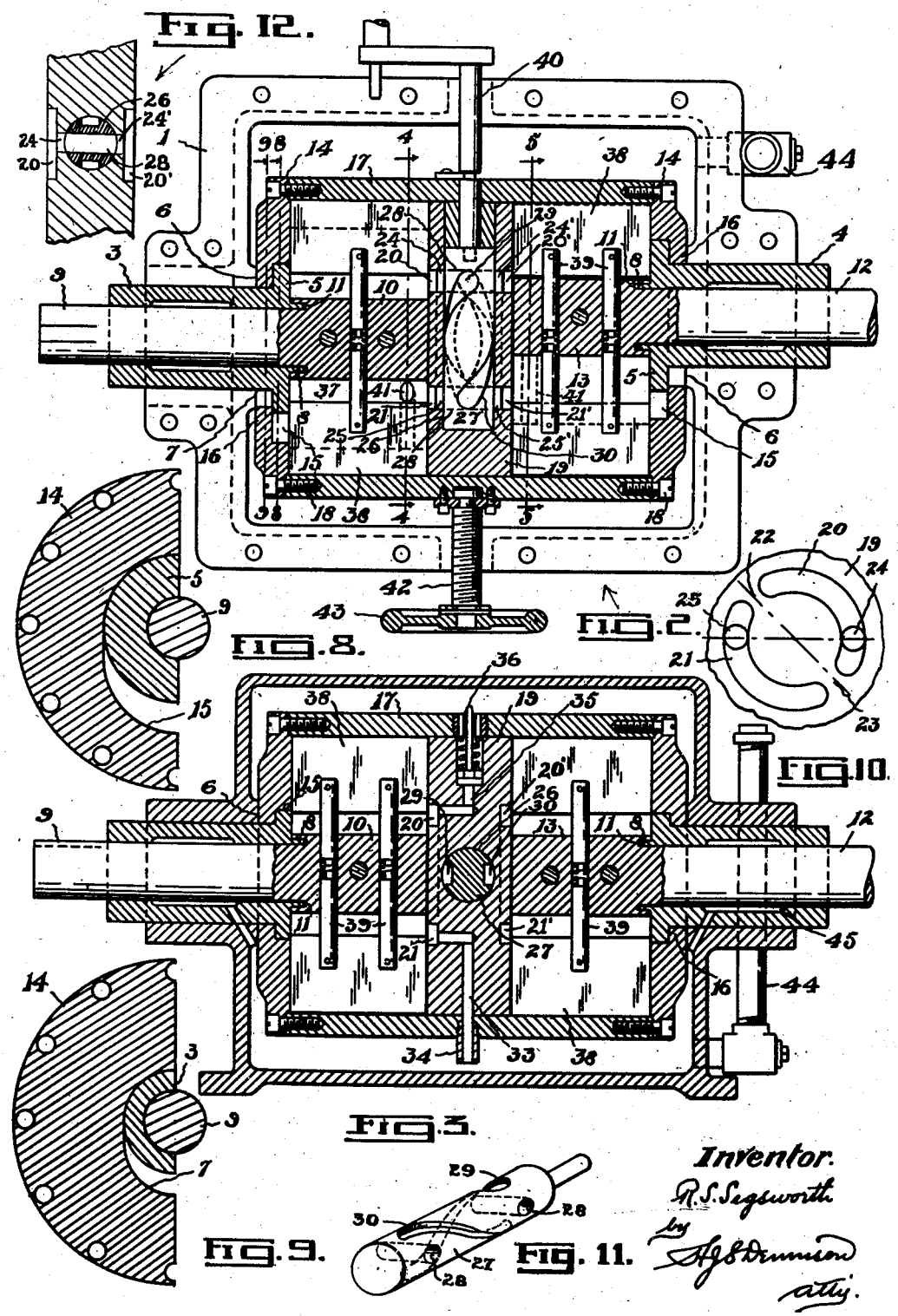

Patented Mar. 11, 1947

2,417,218

UNITED STATES PATENT OFFICE 2,417,218

ROTARY VARIABLE-SPEED HYDRAULIC TRANSMISSION

Robert S. Segsworth, Toronto, Ontario, Canada, assignor to General Engineering Company (Canada) Limited, Toronto, Ontario, Canada Application September 16, 1942, Serial No. 458,561

7 Claims. (Cl. 60—53)

This invention relates to variable speed hydraulic transmissions and the principal object of the invention is to provide a transmission in which the load is constantly connected with the applied power and the speed of the driven member may be varied from zero to maximum by the simple operation of a single element.

A further object is to devise an extremely simple and rugged structure which will require the minimum of attention and will be remarkably easy of control.

The principal feature of the invention consists in the novel arrangement of a pair of vane type rotors mounted on parallel but offset axes within a common cylinder mounted for adjustment in a direction transverse to the axes of the rotors whereby the variable volumetric displacement of the driving rotor is utilized to drive the driven member in a direct ratio to the adjustment of the enclosing cylinder.

In the accompanying drawings

Figure 2 is a horizontal longitudinal section of the machine taken on the line 2—2 of Figure 1.

Figure 3 is a vertical longitudinal section taken on the line 3—3 of Figure 1.

Figure 8 is a half sectional view taken on the line 8—8 of Figure 2.

Figure 9 is a half sectional view taken on the line 9—9 of Figure 2.

Figure 10 is a broken elevational view showing the fluid transfer ducts in one face of the partition block.

Figure 11 is a perspective detail of the reversing valve removed from its recess.

Figure 4:
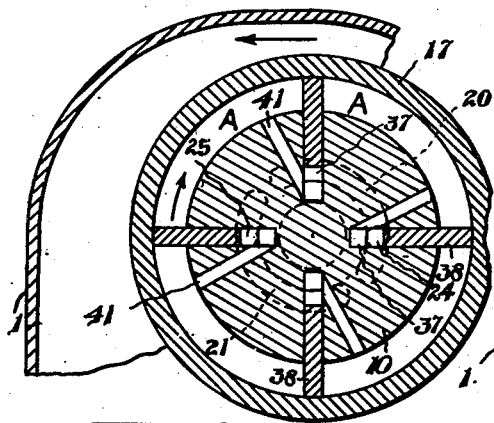
Figure 4 is a vertical section through the driving rotor taken on the line 4—4 of Figure 2 with the cylinder adjusted to the mid-position, a part of the casing being shown in section.

Figure 12 is a vertical sectional view of a portion of the central partition between the adjacent cylinder taken through the openings 24 and 24' and showing a cross section of the valve through one of the openings 28.

In the form of the invention herein shown the outer casing of the machine is formed of a base section 1 and a cover section 2 formed with mating flanges which are suitably bolted together.

A journal bushing 3 is mounted in one end of the casing and a similar journal 4 is mounted in the opposite end but the axes of these journals are offset. The amount of offset will be regulated in accordance with the duty for which the machine is designed and will be further described hereinafter.

Each of the bushings 3 and 4 is formed with an enlarged circular flange 5 adjacent to the inner end which is spaced from the inner face 6 of the bushing supporting boss. A cylindrical extension 8 of reduced diameter is provided on the inner end of each of the bushings 3 and 4.

A drive shaft 9 is mounted in the bushing 3 and has an enlarged cylindrical inner end forming the rotor 10, one end of which abuts the bushing flange 5 and is formed with a circular groove 11 into which the bushing extension 8 extends forming an oil seal.

A driven shaft 12 is mounted in the bushing 4 and has an enlarged cylindrical inner end forming the rotor 13, one end of which abuts the flange 5 of the supporting bushing and has an oil seal groove 11 into which the bushing extension 8 extends.

Circular end plates 14 are mounted on each of the bushings and each of said plates is formed with an elliptical recess 15 on the inner face to receive the bushing flange 5, the long axis of the ellipse being arranged horizontally to permit the plates to be shifted horizontally. The flanges 16 of the end plates engage the outer faces of the bushing flanges 5 and are each formed with horizontal elliptical slots 7 through which the cylindrical portions of the bushings extend.

A cylinder 17 extends between the end plates 14 and is secured thereto by cap screws 18 extending through the outer rim portions thereof.

A cylindrical partition block 19 is arranged within the cylinder 17 and abuts the inner ends of the rotors 10 and 13 and it is provided on one face with arc-shaped recesses 20 and 21 (Figure 10) which are arranged concentrically and are spaced apart by the portions 22 and 23 which are arranged at an angle of 45° from the horizontal axis. The opposite face of block 19 is provided with arc-shaped recesses 20' and 21' opposite the respective recesses 20 and 21.

Openings 24 and 24' parallel to the horizontal axis of the partition block 19 extend inwardly from the recesses 20 and 20' respectively to a cylindrical recess 26 horizontally arranged in the block 19. Similarly, openings 25 and 25' extend from recesses 21 and 21' to the recess 26.

Within the recess 26 is arranged a cylindrical valve 27 (Figure 11) which is provided with transverse holes 28 therethrough which are adapted to register with the oppositely arranged pairs of openings 24, 24' and 25, 25'. Pairs of spiral grooves 29 and 30 are oppositely arranged in the periphery of the valve 27 so that on the valve being turned the outward ends will form communicating passages to connect opening 24 with 25' and 25 with 24', respectively. It will be understood that the transverse holes 28 provide direct communication ducts from the recesses 20 and 21 on one side to the recesses 20' and 21' on the opposite side of the partition block and the spiral grooves form cross-over ducts to connect the recesses 20 and 21 on one side of the partition block to the recesses 21' and 20' on the opposite side. The purpose of this arrangement will be later explained.

A duct 33 is formed in the partition block at substantially right angles to the valve recess 26 and at the inner end communicates with the recess 21 and at the outer end with an oil supply pipe 34 which is open to the interior of the casing of the machine.

A duct 35 is formed in the partition block diametrically opposite to the duct 33 and leads from the recess 20 to a pressure relief valve 36 which opens into the interior of the outer casing and outside the cylinder.

Each of the rotors 10 and 13 is provided with a plurality of radial slots 37 in which are slidably mounted the piston vanes 38 which are preferably mounted on radial rods 39 supported in holes bored radially inward from the bottom of the slots 37. Compression springs are arranged between the opposing ends of the piston supporting rods to hold the outer edge of the vanes in contact with the inner wall of the cylinder.

A cranked rod 40 for operating the valve 27 is rotatably mounted in the cylinder and is connected at its inner end to the valve 27 and the outer end extends through a boss in the outer casing and slides therein.

The recesses 20 and 21, 20' and 21' communicate with the inner ends of the radial slots 37 of the rotors as the rotors rotate and ducts 41 extend angularly outwardly from the bottom of each of the slots 37 to the peripheries of the rotors (Figures 4 to 7) so that oil will flow through said ducts from the driving rotor to the recess 20 as the rotor 10 rotates and, flowing either through the transverse hole 28 in the valve 27 to opening 24' and recess 20' or through spiral ducts 29 to opening 25' and recess 21', it enters the radial slots of the driven rotor and flows out through the ducts 41 in said rotor and effects the propulsion of the driven rotor. The return flow from the chamber of the driven rotor 13 will be by way of ducts 41 and 37, those which are not at the time operating as inlet passages with a recess 20' or 21' which is not at the same time operating as an inlet passage. Then from, say 20' either directly through passage 28 to recess 20 or through spiral passage 30 to 21, depending upon the position of the valve 27, or from 21' directly through 28 to recess 21 or by way of spiral passage 29 to recess 20, again depending upon the position of valve 27.

Oil is preferably used as the propelling medium and the cylinder is full. When the cylinder 17 is adjusted to the position shown in Figure 4 so that it is concentric with the driving rotor 10 all the spaces enclosed between the cylinder and rotor and the adjacent pairs of vanes are equal and there will be no flow of oil through the ducts and passages leading to the driven element.

The adjustment of the cylinder is effected by the spindle 42 which is threaded in a boss in the outer casing and is rotatably connected at its inner end to the cylinder 17, the spindle being operated by a hand wheel 43. It will of course be understood that a sliding rod and suitable lever connections may be used to operate the cylinder to obtain quick operation of ratio change in the transmission of oil from the driving to the driven element.

Figure 5:
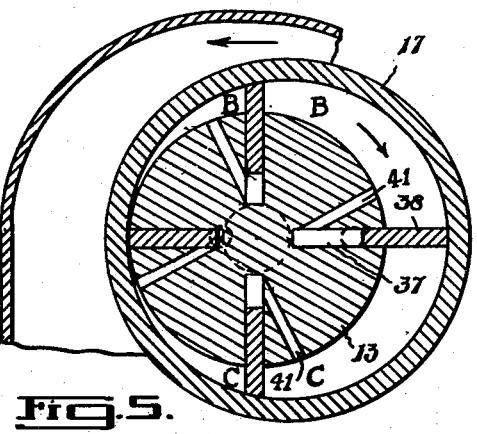
Figure 5 is a vertical section through the driven rotor taken on the line 5—5 of Figure 2 showing the relative position of the cylinder to the rotor when the cylinder is in the position illustrated in Figure 4 relative to the driving rotor.

In the operation of this machine, when the cylinder 17 is adjusted to the position shown in Figure 4 the rotor 10 is concentric to the cylinder and the chambers A enclosed by the radial vanes of the rotor are of equal volume and the motor fluid contained therein rotates with the rotor and consequently there will be no transfer of such fluid to the chambers between the vanes of the adjacent rotor 13 which, because of the offset arrangement of the rotor shafts, is in the extreme eccentric position within the cylinder, as illustrated in Figure 5.

By moving the cylinder horizontally in the direction of arrow Figure 4 the cylinder and rotor 10 are brought into an eccentric relation and the fluid within the chambers A is forced by the movement of the rotor vanes 38 into converging enclosures formed between the cylinder wall and the periphery of the rotor 10 and caused to flow under full pressure of the power applied, through the ducts 41 in the rotor to slots 37 below the vanes registering with recesses 20 and through opening 24, and when the valve is in its Fig. 2 position, through the inter-communicating duct 28 through opening 24' and recess 20' to the slots of the inner ends of the vanes registering with recess 20' and out through ducts 41 in rotor 13 to the spaces marked B, B in Figure 7, causing rotation of rotor 13 in the direction of the arrow in Figure 7. The fluid from spaces C, C is forced out through ducts 41 to the slots below the vanes registering with recess 21', through opening 25', duct 28, opening 25, recess 21 to the slots registering with the recess 21 and out through the ducts 41 of rotor 10 to the spaces D, D in Figure 6 from where during the rotation of rotor 10 it is transferred to spaces A, A to be recirculated as above explained.

When the valve is turned to connect opening 24 to opening 25' the fluid flow will be from opening 24, through groove 29, opening 25' to recess 21' and the slots below the vanes registering with recess 21' and out through ducts 41 to the spaces C, C to cause counter-clockwise movement of rotor 13, fluid from spaces B, B being returned through ducts 41, the slots below the vanes registering with recess 20' through recess 20', opening 24', groove 30, opening 25, recess 21 and ducts 41 to spaces D, D for re-circulation as noted.

As the cylinder 17 is moved further in the direction of arrows in Figures 4 and 5 the displacement of the motive fluid per revolution from the chambers A of the rotor 10 is progressively increased while the displacement capacity per revolution of the chambers B of the rotor 13 is correspondingly decreased, with the result that there will be an increase in flow of fluid from the driving member to the driven member, resulting in an increase in the travel of the driven member in relation to the driving member. The ratio of increase of output speed will vary in accordance with the movement of the cylinder.

Figure 6:
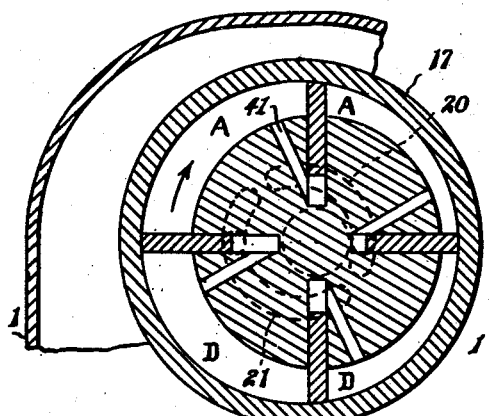
Figure 6 is a view similar to Figure 4 showing the cylinder adjusted in off-centre relation to the rotor.
Figure 7:
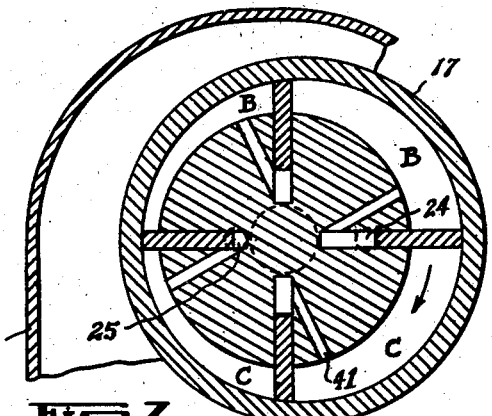
Figure 7 is a view similar to Figure 5 showing the relative position of the driven rotor when the cylinder is in the position shown in Figure 6 relative to the driving rotor.
Figure 1:
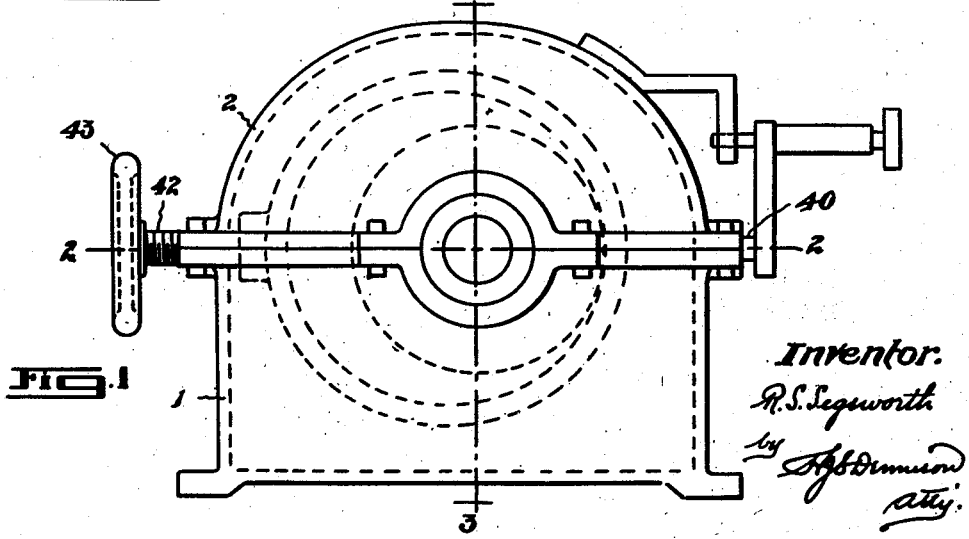
Figure 1 is an end elevation of the machine.

When the cylinder and rotors are in the position shown in Figures 6 and 7 the discharge per revolution from the driving rotor will be equal to the receiving capacity per revolution of the driven rotor and the transmitted speed will be equal. Further movement of the cylinder will create an increased volume per revolution from the driving member and a further reduction per revolution of the receiving capacity of the driven member, consequently the speed ratio will be raised above the point of equality and the driven member will be operated at an increasingly higher speed than the driving member as the position of the cylinder continues to be changed.

The motive fluid contained in the decreasing volumetric capacity chambers C in the driven member is returned to the chambers D of the driving member as previously described.

The cylinder may be moved from the neutral or zero position to cause a gradual increase in speed ratio for the maximum range of the mechanism and from the maximum back to zero, and the load is at all times directly connected with the applied power.

The device may be operated to drive the driven member in either direction with an equal range of ratio adjustment by the manipulation of the valve 27 to cause the motive fluid to be discharged into the chambers C of the driven member as previously described.

The supply of oil in the cylinder chambers is maintained through the duct 33 which is open to the chamber within the outer casing and the oil in said casing is maintained through a supply tube 44.

It will be understood that as the working parts are at all times immersed in a bath of oil all parts will be perfectly lubricated and oil-intercepting recesses 45 are arranged in the bushings 3 and 4 and these are provided with return ducts to return excess oil to the chamber of the main casing.

What I claim as my invention is:

1. A variable speed transmission comprising a casing, a drive shaft journalled in one end of said casing, a driven shaft having its axis axially spaced from and parallel but non-coaxial with the axis of said drive shaft, a radial vane type rotor mounted on each of said shafts, aligned and rigidly connected cylinders having inter-communicating ports in their adjacent ends enclosing said rotors and engaging the vanes thereof and mounted for simultaneous adjustment in a direction transverse to the axes of said shafts and rotors whereby the volumetric displacement per revolution of one rotor is utilized to drive the other rotor in a direct ratio to the adjustment of the enclosing cylinder.

2. A variable speed hydraulic transmission comprising, a pair of vane type rotors mounted on axially spaced parallel non-coaxial axes, a single cylinder having an unbroken inner peripheral surface enclosing both of said rotors, a partition block arranged within said cylinder between the adjacent ends of said rotors and dividing said cylinder into separated chambers, ducts communicating directly from chamber-to-chamber extending transversely through said block for directing the motive fluid discharged from the driving rotor to the driven rotor, and means for adjusting said cylinder in a direction transverse to the axes of said rotors.

3. A variable speed hydraulic transmission comprising, a pair of vane type rotors mounted on axial spaced parallel non-coaxial axes, a single cylinder embracing both of said rotors, a partition block arranged within said cylinder and separating the adjacent ends of said rotors and having ducts therethrough for directing a motive fluid discharged from the driving rotor to the driven rotor, said partition block having arc-shaped recesses arranged in concentric separated pairs in the opposite faces of said partition block, passages extending through said partition block connecting said arc-shaped recesses therethrough in opposite pairs, said arc-shaped recesses being in sealed engagement with the ends of the rotors and communicating with the chambers between the rotor vanes through said rotors and means for adjusting said cylinder in a direction transverse to the axes of said rotors.

4. A variable speed hydraulic transmission comprising, a pair of rotors mounted on axially spaced non-coaxial axes each having a plurality of radial slots, vanes mounted in said slots and extending radially therefrom, passages extending inwardly from the periphery of said rotors communicating with the inward ends of said vane slots, a common cylinder enclosing both of said rotors and capable of adjustment in a direction transverse to the axes of said rotors, a partition block mounted intermediate of the length of said cylinder and separating said rotors and having in the opposite faces thereof paired arc-shaped recesses communicating with the inward ends of said vane slots, passages extending through said partition connecting opposite pairs of said arc-shaped recesses, and means for adjusting the position of said cylinder relative to said rotors.

5. A device as claimed in claim 4 in which said partition block is formed with a recess extending at right angles to and intercepting the transverse passages therethrough connecting the arc-shaped recesses communicating with the vane slots of the rotors, and a reversing valve rotatably mounted in said recess having direct transverse passages therethrough to register with the registering direct transverse passages in the partition block and having cross-over passages to connect oppositely arranged transverse passages in said block to reverse the discharge flow of fluid, and means secured to and laterally adjustable with said cylinder for controlling the operation of said valve.

6. A variable speed hydraulic transmission, comprising a casing having bosses at the ends, journal bushings mounted in the bosses in the ends of said casing having their axes parallel to one another but offset laterally, said bushings each having circular flanges at their inner ends spaced from the end walls of the casing, shafts journalled in said bushings having rotors on their inner ends, outwardly extensible vanes mounted in said rotors, a circular end plate mounted on the flanged end of each of said bushings having an elliptical recess in the inner face receiving the flanges of the bushings and an elliptical recess surrounding the portion of the bushing between the flange and the casing, a cylinder secured between said end plates and enclosing both of said rotors, a partition block mounted in said cylinder between said rotors and engaging the ends thereof and adapted to engage the vanes of said rotors, passages extending through said partition block, passages in said rotors communicating with the passages in said partition block, and means for moving the cylinder transversely to the axes of said shaft and rotors.

7. A variable speed hydraulic transmission, comprising an enclosed casing having journal bearings arranged at opposite ends and radially offset, a shaft journalled in each of said bearings and each having an enlarged cylindrical end forming a rotor, radial slots formed in said rotors, vanes slidably arranged in said radial slots, a common cylinder enclosing both of said rotors and movable transverse to the axes thereof, means for adjusting the position of said cylinder relative to said rotors, a partition block arranged within said cylinder between the ends of said rotors having recesses in the face thereof communicating with the slots in said rotors, ducts connecting the recesses in the face of one side of said partition block with the recesses in the opposite face of said block, a duct communicating with one of said recesses and extending through said partition block and opening outwardly through said cylinder to the interior of the casing and forming an oil supply duct, a duct communicating with said recesses in the face of said partition block and extending outwardly and through the cylinder to the interior of the casing, and a relief valve mounted in the latter duct.

ROBERT S. SEGSWORTH.

REFERENCES CITED

The following references are of record in the file of this patent:

UNITED STATES PATENTS

| Number | Name | Date |
|---|---|---|
| 1,231,647 | Reece | July 3, 1917 |
| 1,426,902 | Noel et al. | Aug. 22, 1922 |
| 1,497,741 | Schneider | June 17, 1924 |
| 1,592,864 | Magie et al. | July 20, 1926 |
| 1,726,481 | Ferris | Aug. 27, 1929 |
| 1,777,851 | Kühn | Oct. 7, 1930 |
| 2,195,246 | Guinness | Mar. 26, 1940 |
| 2,227,631 | Carter | Jan. 7, 1941 |
| 2,393,479 | Segsworth | Jan. 22, 1946 |

FOREIGN PATENTS

| Number | Country | Date |
|---|---|---|
| 216,525 | British | Nov. 27, 1924 |
| 234,680 | British | May 27, 1925 |
| 290,349 | German | Feb. 23, 1916 |
| 519,686 | German | Mar. 3, 1931 |
| 45,190 | Swiss | May 21, 1908 |